Nov. 9, 1965    H. C. FEDER    3,216,237
STEPFUNCTIONAL CENTRIFUGE
Filed March 8, 1963    2 Sheets-Sheet 1
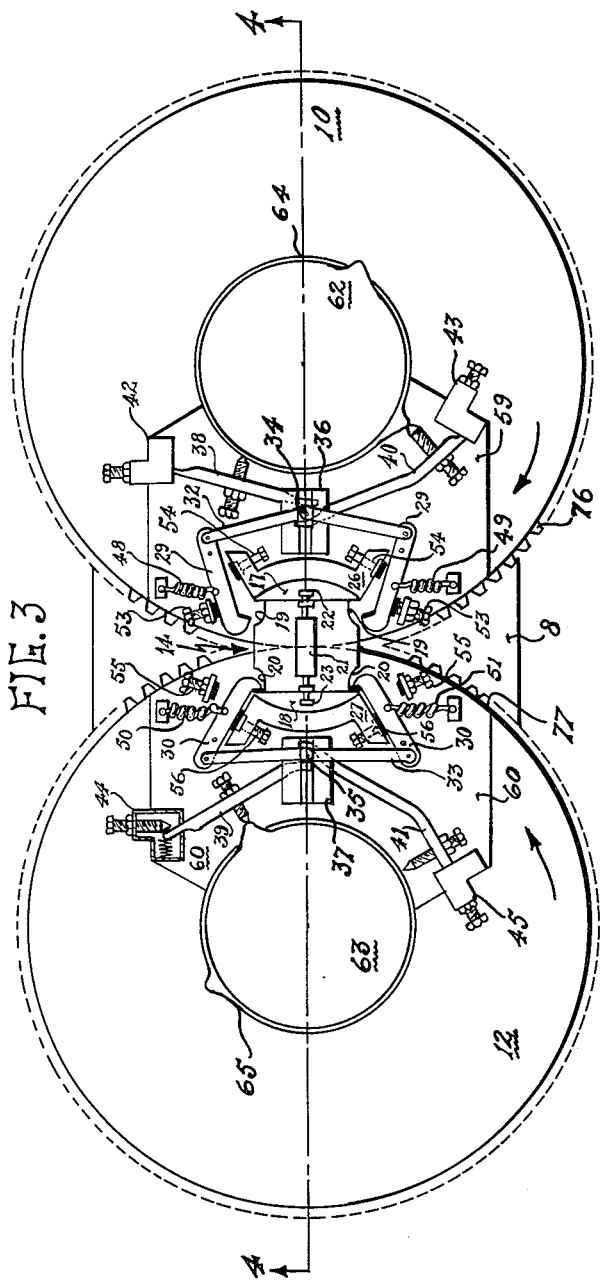
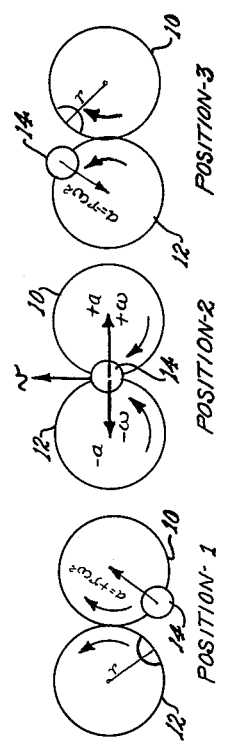
INVENTOR.
HUBERT C. FEDER
BY
Lawrence S. Galka
ATTORNEYS Nov. 9, 1965 H. C. FEDER 3,216,237
STEPFUNCTIONAL CENTRIFUGE
Filed March 8, 1963 2 Sheets-Sheet 2
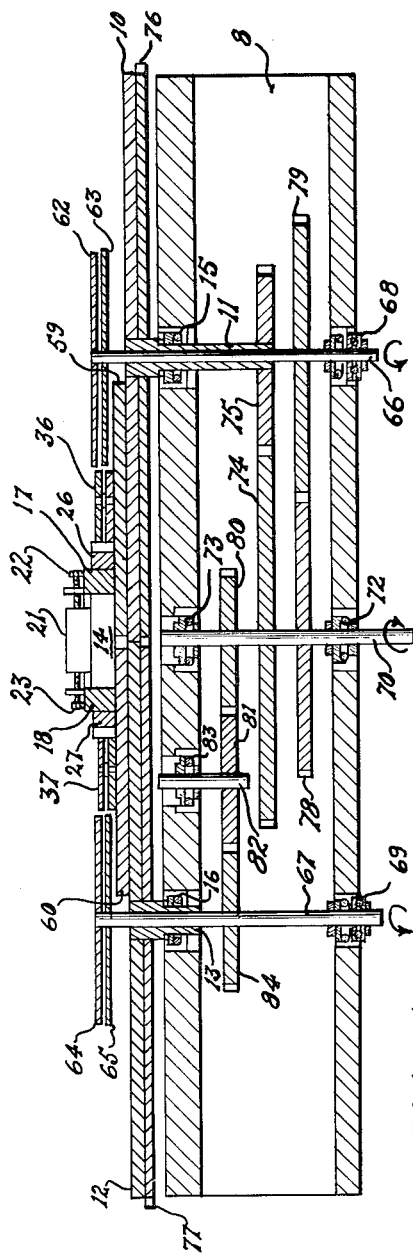
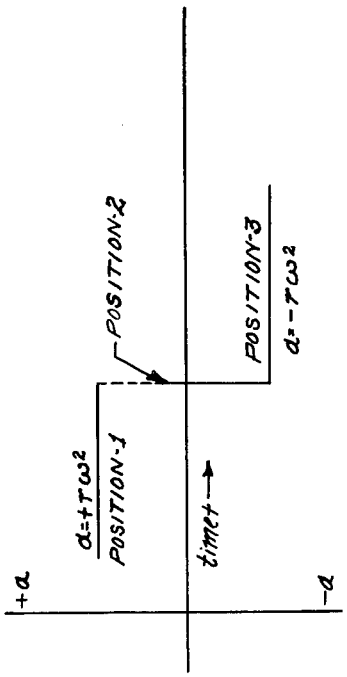
INVENTOR.
HUBERT C. FEDER
BY
Lawrence S. Galka
ATTORNEYS United States Patent Office 3,216,237
Patented Nov. 9, 1965

3,216,237
STEPFUNCTIONAL CENTRIFUGE
Hubert C. Feder, 1517 Roosevelt Ave.,
Alamogordo, N. Mex.
Filed Mar. 8, 1963, Ser. No. 264,003
11 Claims. (Cl. 73—1)
(Granted under Title 35, U.S. Code (1952), sec. 266)

The invention described herein may be manufactured and used by or for the Government for governmental purposes without the payment of any royalty thereon.

This invention relates in general to test apparatus for subjecting various objects to centrifugal force and in particular to a stepfunctional centrifuge for calibrating accelerometers or the like.

It is fundamental that a body transversing a circular path, at a radius revolving with constant angular velocity about an axis will have a continual velocity change in direction, although not in magnitude. Whereas, acceleration is a velocity change, either in direction or magnitude, per unit time, the body experiences an acceleration, which has been determined to be the product of the radius and the square of angular velocity. Thus, the conventional centrifuge has been employed in the past for accelerometer calibration by furnishing a constant radial acceleration, the value of which may be calculated and compared to the accelerometer response. However, since the exact location of the sensing mass within the accelerometer is not always known, the exact radius is unknown and thus, accurate calibration is not always feasible.

Moreover, the response specifications of commercial strain gage type accelerometers have usually been based on a calibration by an assumed stepfunctional, i.e. instantaneous, change from one value to another of the applied constant radial acceleration. Prior art attempts to generate stepfunctional acceleration changes have involved impact accelerations, which impose serious recording and analysis complications due to accompanying energy transformations and the transient shock waves thereof. Furthermore, the shake tables, heretofore employed, generate acceleration change relationships that are not truely stepfunctional, but are sinusoidal in character.

It is therefore, an object of this invention to generate a non-impact stepfunctional change of acceleration.

It is another object of this invention to provide a stepfunctional stress generator for the application of abrupt non-impact changes of force to various test subjects.

Another object is to accurately calibrate an accelerometer by providing a centrifuge capable of an adjustment calibration to exactly locate the accelerometer sensing mass.

A further object is to provide a stepfunctional centrifuge for fast, easy and accurate calibration of accelerometers.

It is still another object of the invention to provide a stepfunctional centrifuge which is economical to produce and utilizes conventional, currently available components that lend themselves to standard mass production manufacturing techniques.

Other objects and a fuller understanding of this invention may be had by referring to the following description and claims, taken in conjunction with the accompany drawings in which:

FIGURE 1 is a schematic demonstration of the principle employed by this invention for the generation of non-impact stepfunctional acceleration changes;

FIGURE 2 is a graphical representation of the stepfunctional acceleration change relationship, as generated in FIGURE 1;

FIGURE 3 is a plan view of a stepfunctional centrifuge and

FIGURE 4 is a cross-sectional side view of FIGURE 3.

With reference to the drawings, presently FIGURES 1 and 2, a pair of centrifugal machines, indicated generally by spin disks 10 and 12, are provided to subject body 14 to centrifugal forces by spinning in separate operational orbits. As indicated, the disks are of equal radius $r$ and have a contrarotation with respect to each other. Both are rotating at the same magnitude of constant angular velocity $\omega$. The different rotational directions are accounted for by arbitrarily assigning a plus sign to the clockwise rotation of disk 10 ($+\omega$) and a minus sign to the contraclockwise rotation of disk 12 ($-\omega$). Thus, acceleration experienced by body 14, though of constant magnitude, has difference of direction, distinguished as plus or minus, which is dependent upon the machine of generation. In FIGURE 1, Position 1, body 14 experiences a constant radial acceleration ($a=+r\omega^2$) generated on machine 10 and plotted as a straight horizontal line in FIGURE 2. At Position 2, body 14 is intermediate the machines with the geometrical centers of the body 14 and the disks 10 and 12 in alignment. The acceleration directions on the disks are, at this position, diametrically opposed with respect to each other. At this critical instant, an instantaneous acceleration change, plotted as a vertical line in FIGURE 2, is accomplished by switching body 14 between the machines, from disk 10 to disk 12. Whereas, the linear velocities $v$ of body 14, on either machine, are equal in magnitude and coincide with identical direction at Position 2, the switching of body 14 is accomplished without any velocity change whatsoever, and thus, is free of impact. Now, at Position 3, body 14 experiences the constant radial acceleration ($a=-r\omega^2$) generated on machine 12 and plotted as a straight horizontal line in FIGURE 2. In the foregoing manner, the graph thus plotted represents a theoretic stepfunctional change relationship. Of course, in practice, some time and travel distance are required for switching. Nevertheless, the amounts concerned may be limited to negligible values, and the acceleration changes regarded, for practical purposes, as stepfunctional and impact free.

A specific embodiment of a stepfunctional centrifuge is described herein with reference to FIGURES 3 and 4. Naturally, it is understood that the centrifugal machines of this invention may differ from the description by utilizing spinning disks, or levers, or the like, with radii and angular velocities which may be equal or unequal, constant or variable, but appropriately combined to accomplish impact free switching of a body therebetween.

Support housing 8 may be of any sturdy material and configuration suitable for the placement of various bearings therein.

As illustrated at FIGURE 4, a pair of equal radius spin disks 10 and 12 are securely affixed on the sleeves 11 and 13 which, in turn are mounted to revolve in bearings 15 and 16, respectively. Bearings 15 and 16 are placed in housing 8 so that the disks 10, 12, are coplanar and tangent and free to contrarotate with respect to each other.

Transfer body 14 has opposed ends 17 and 18, of arcuate shape, each bordered as shown in FIGURE 3, by pairs of catch notches 19 and 20. Many known means to position and hold a test subject are available, and, in this case, accelerometer 21 is secured by set screw 22 and 23. It is evident, that an accelerometer position adjustment, from side to side, may be made by proper movement of the screws. Clearly, more elaborate means are available for any particular test subject and position relationship thereof, those shown being for purposes of simplified illustration.

Detent means are provided at each disk for the alternate capture and release, between each other, of the transfer body 14. Naturally, the detent means employed must securely lock body 14 on each disk for one or more revolutions, and various mechanical, pneumatic, hydraulic, electromagnetic, and other choices exist therefor. In the preferred embodiment, detent means have been provided by receptor structures 26, 27, in conjunction with the pairs of detent levers 29 and 30. As illustrated, each receptor structure is affixed on a radius at an outer position near the periphery of each disk. In addition, the receptor structures 26 and 27 are each shaped to form a concave, outward opening, receiving surface which is symmetric to a disk radius. Both of the surfaces, thus formed, are arcuate to match ends 17, 18, and, have radial symmetry, thus enabling the transfer body 14 to be radially aligned on each disk by a matching engagement therewith. Though other shapes may also be adequate, the arcuate shape is believed most practical as it also allows for a slight rotation of the body 14 as it approaches and departs from a receptor structure. The arcuate ends 17, 18, of transfer body 14 are captured and held in matching engagement with either of the receiving surfaces, at structures 26, 27, by one of the pairs of detent levers 29, 30, which are pivoted, as shown, with one lever at each side of a receptor structure, for engagement and disengagement with catch notches 19, 20. Thus, in the figure, detent levers 30 engage notches 20 while levers 29 disengage from notches 19. Activation for each pair of detent levers 29, 30, is provided by the toggles 32, 33 pivoted therebetween. Movement of the toggle knee pivots 34, 35 within guide blocks 36, 37, in an outward direction, toward the disk peripheries, activates engagement, while an opposite, inward movement activates disengagement. Links 38 and 39 are pivoted to respond to as outward force by moving knees 34 and 35, respectively, in an outward direction. Links 40 and 41 are pivoted to respond to an outward force by moving knees 34 and 35, respectively, in an inward direction. The spring adjustments 42, 43, 44 and 45 have been provided to maintain the links in proper operative positions. Each of detent levers 29, 30, is biased for disengagement by the springs 48, 49, 50, and 51, which also oppose outward movements of toggle knees 34 and 35 up to toggle "dead center," i.e., an aligned toggle position. Further outward knee movement past dead center will be aided by the bias to abut a toggle knee 34, 35, against one of links 40, 41, thereby locking the toggle. Adjustable stops at 53, 54, 55, and 56, each present a resilient shock absorbent material to limit movement of levers 29, 30. It may also be desirable to provide resilient shock absorbent material between the engaging surfaces of transfer body 14, detent levers 29, 30 and receptor structures 26 and 27. To facilitate fabrication, the entire detent means described above, may be assembled on assembly plates 59, and 60, which in turn, are affixed on each of the disks 10, 12, as illustrated.

Synchronizing means for activation, at the proper instant, of the afore-described detent means, may be provided by various mechanical, electromagnetic, or electronic, combinations, the mechanical cam means described here, merely being one of the choices available. As shown, cams 62, 63, 64 and 65, are affixed in concentric right angle pairs to shafts 66 and 67, which revolve in sleeves 11, 13 and bearings 68, 69. A first set of gears, 74, 75, 76, and 77 are affixed on sleeves 11, 13 and on the drive shaft 70, which is journaled in housing 8 at bearings 72 and 73. Gears 74, 75, are at a 2:1 ratio and gears 76, 77, are at a 1:1 ratio, all combining to drive disks 10, 12. A second set of gears, 78, 79, 80, 81, and 84, are provided to drive the cams 62, 63, 64 and 65. Gears 78 and 79 are of 1:1 ratio and are affixed to shafts 70 and 66, respectively. Reversing gear 81 is affixed on shaft 82, which is journaled between gears 80 and 84 at bearing 83, as shown. The drive shaft 70 is driven at a constant rotation by motive source such as an electric motor (not shown). The 2:1 ratio of gears 74, 75 will cause disk 10 to rotate at twice the speed of shaft 70. Whereas, gear 76 drives gear 77, with 1:1 ratio it is apparent that disks 10 and 12 contrarotate at equal speeds. The drive shaft 70 simultaneously drives the second set of gears to rotate the cams with the same rotational speed of shaft 70, and thus, at half the speed of disks 10 and 12. Reversing gear 81 allows contrarotation of the cams. The cams 62, 63, 64, and 65, each project outward to produce, on each revolution, an outward force operating, respectively, on one of links 38, 39, 40, and 41. As illustrated, the cams are positioned in a phase relationship for synchronized activation of detent lever pairs 29 and 30. Therefore, in FIGURE 3, with receptor structures 26, 27 in opposed alignment and transfer body 14 therebetween, cam 64 activates levers 29 to release while cam 63 activates levers 30 to capture. A full revolution of the disks will be accompanied by a corresponding half revolution of the cams, at which time, it may be visualized, cam 62 will activate levers 29 to capture while cam 65 activates levers 30 to release. In this manner, body 14 is switched at each revolution of the disks 10, 12, from one to the other, thereby providing stepfunctional changes of centrifugal force on said body.

For accelerometer calibration, an accelerometer 21 is positioned at the center of transfer body 14 and the stepfunctional centrifugal forces are applied. Transfer of the accelerometer responses from the rotating machines to a stationary recorder (not shown) may be accomplished by known arrangements of pressure contacts and slip rings. However, with the double centrifuge arrangement, a direct overhead wire connection is feasible, at least for slower rotations, since a wire twisted 360° during one revolution would be untwisted during the following revolution at the other disk. Accelerometer response readings are taken, and the position of accelerometer 21 is adjusted from side to side until equal readings of response are obtained for both disks. In this manner, the sensing means within accelerometer 21 is positioned exactly at the radius of disks 10, 12. Now an exact acceleration calculation may be made and correlated to the indicated response, thereby accurately calibrating the accelerometer.

Although the invention has been described with reference to a particular embodiment, it will be understood to those skilled in the art that the invention is capable of a variety of alternative embodiments within the spirit and scope of the appended claims.

I claim:

1. A stepfunctional centrifuge, comprising: a pair of centrifugal machines for subjecting a body to centrifugal forces; separate detent means mounted for rotation on each of said machines for capture and release of said body; and synchronizing means to activate said detent means, to capture and to release, respectively, said body while said body is intermediate said machines during operation thereof, thereby switching said body between said machines to provide stepfunctional changes of centrifugal forces on said body.

2. A stepfunctional centrifuge, comprising a pair of juxtapositioned centrifugal machines having proximate operational orbits for subjecting a body to centrifugal forces; separate detent means mounted for rotation on each of said machines for capture and release of said body in said orbits; and synchronizing means to activate said detent means, to capture and to release, respectively, said body while said body is intermediate said orbits, thereby switching said body between said machines to provide stepfunctional changes of centrifugal forces on said body.

3. A stepfunctional centrifuge, comprising: a pair of juxtapositioned centrifugal machines having proximate and coplanar operational orbits for subjecting a body to centrifugal forces; separate detent means mounted for rotation on each of said machines for capture and release of said body while containing said body in said orbits; and synchronizing means for periodically activating said detent means, one to capture and other to release, respectively, said body while said body is intermediate said orbits, thereby switching said body between said machines to provide stepfunctional changes of centrifugal forces on said body.

4. A stepfunctional centrifuge, comprising: a pair of juxtapositioned centrifugal machines having tangent and coplanar operational orbits of contrarotation for subjecting a body to centrifugal forces; separate detent means mounted for rotation on each of said machines to alternately capture and release said body while containing said body in said orbits; and synchronizing means for periodically activating said detent means, one to capture and other to release, respectively, said body while said body is intermediate said orbits, thereby switching said body between said machines to provide stepfunctional changes of centrifugal forces on said body.

5. A stepfunctional centrifuge, comprising: a pair of juxtapositioned centrifugal machines having tangent and coplanar operational orbits of contrarotation at equal and constant rotational rates; a transfer body securely holding a test subject thereon; separate detent means mounted for rotation on each of said machines to alternately capture and release said transfer body while containing said body in said orbits; and synchronizing means for periodically activating said detent means, one to capture and other to release, respectively, said body while said body is intermediate said orbits, thereby switching said body between said machines to provide stepfunctional changes of centrifugal forces on said body.

6. A stepfunctional centrifuge, comprising: a pair of juxtapositioned centrifugal machines having tangent and coplanar operational orbits of contrarotation at equal and constant rotational rates; a transfer body with means for securely holding a test subject and having a catch; receptor structures affixed, on each of said machines, to position and contain said body in said orbits; detent means associated with each of said receptor structures for capture and release of said body by engagement and disengagement with said catch; and synchronizing means for periodically activating said detent means, to capture and to release, respectively, said body while said body is intermediate said orbits, thereby switching said body between said machines to provide stepfunctional changes of centrifugal forces on said body.

7. A stepfunctional centrifuge, comprising: a support housing; a pair of coplanar and tangent spin disks mounted to revolve on said housing; a transfer body with means for securely positioning and holding a test subject and having a catch; receptor structures affixed, one on each of said disks, at a radius thereof; detent means associated with each of said receptor structures for capture and release of said body by engagement and disengagement with said catch; and synchronized drive means for spinning said disks with contrarotation at equal and constant rates while periodically activating said detent means, one to capture and other to release, respectively, said body while said body is intermediate said disks, thereby switching said body therebetween to provide stepfunctional changes of centrifugal forces on said body.

8. A stepfunctional centrifuge, comprising: a support housing; a pair of coplanar and tangent spin disks mounted to revolve on said housing; a transfer body with means for securely positioning and holding a test subject and having catch notches; receptor structures affixed, one on each of said disks, at a radius thereof; pairs of detent levers pivoted on said disks proximate each of said receptor structures for capture and release of said body by engagement and disengagement with said catch notches; and synchronized drive means for spinning said disks with contrarotation at equal and constant rates while periodically activating said pairs of detent levers, one pair to capture and other pair to release, respectively, said body while said body is intermediate said disks, thereby switching said body between said disks to provide stepfunctional changes of centrifugal forces on said body.

9. A stepfunctional centrifuge, comprising: a support housing; a pair of coplanar and tangent spin disks affixed on sleeves mounted to revolve in said housing; a transfer body with means for securely positioning and holding a test subject and having pairs of catch notches therein; a pair of receptor structures, one affixed on each of said disks, at a radius thereof; pairs of detent levers pivoted on said disks beside each of said receptor structures for capture and release of said body by engagement and disengagement with said pairs of catch notches, said pairs of levers activated by toggles pivoted therebetween; cams positioned to operate said toggles and affixed on shafts mounted to revolve in said sleeves; and synchronized drive means for spinning said disks with contrarotation at equal and constant rates while rotating said cams to periodically operate said toggles activating said detent levers, one pair to capture and other to release, respectively, said body while said receptor structures are in apposed alignment with said body therebetween, thereby switching said body between said disks to provide stepfunctional changes of centrifugal forces on said body.

10. A stepfunctional centrifuge, comprising: a support housing; a pair of coplanar and tangent spin disks affixed on sleeves mounted to revolve in said housing; a transfer body with means for securely positioning and holding a test subject and having apposed arcuate ends with bordering pairs of catch notches; a pair of receptor structures having concave arcuate receiving surfaces matching said ends, one affixed on each of said disks at a radially symmetric outer position; pairs of detent levers pivoted on said disks beside each of said receptor structures for capture and release of said body by engagement and disengagement with said pairs of catch notches, said pairs of levers activated by toggles pivoted therebetween; pairs of concentric cams positioned to operate said toggles and affixed on shafts mounted to revolve in said sleeves; and synchronized drive means having gears mounted in said housing and on said sleeves and shafts for spinning said disks with contrarotation at equal and constant rates while rotating said cams to periodically operate said toggles activating said detent levers, one pair to capture and other to release, respectively, said body while said structures are in apposed alignment with said body therebetween, thereby switching said body between said disks to provide stepfunctional changes of centrifugal forces on said body.

11. A stepfunctional centrifuge, comprising: a support housing; a pair of coplanar and tangent spin disks of equal radius affixed on sleeves mounted to revolve in said housing; a transfer body with means for securely positioning and holding a test subject and having apposed arcuate ends with bordering pairs of catch notches; a pair of receptor structures having concave arcuate receiving surfaces matching said ends, one affixed on each of said disks at a radially symmetric outer position; pairs of detent levers pivoted on said disks beside each of said receptor structures for alternate capture and release of said body by engagement and disengagement with said pairs of catch notches; toggles pivoted between each of said pairs of levers for activation thereof by inward and outward movements of knees in said toggles; pairs of links pivoted on said disks in contact with said knees; pairs of concentric cams positioned to transmit operating forces through said links to alternately move said knees inwardly and outwardly, said cams affixed on shafts mounted to revolve in said sleeves; a first set of gears mounted to revolve in said housing and on said sleeves to drive said disks at equal rates in opposite directions; and a second set of gears mounted to revolve in said housing on said shafts and synchronized with said first set of gears to revolve said cams and periodically operate said toggles activating said detent levers, one pair to capture and other to release, respectively, said body while said receptor structures are in apposed alignment with said body therebetween, thereby switching said body between said disks to provide stepfunctional changes of centrifugal forces on said body.

References Cited by the Examiner
UNITED STATES PATENTS

| | | | |
|---|---|---|---|
| 1,412,711 | 4/22 | Sabot et al. | 272—37 |
| 2,924,092 | 2/60 | Bourns et al. | 73—1 |

LOUIS R. PRINCE, *Primary Examiner.*